(12) United States Patent
Dunlap et al.

(10) Patent No.: US 6,708,988 B2
(45) Date of Patent: Mar. 23, 2004

(54) HANGERS FOR TRAILER HEIGHTS ADJUSTMENT

(75) Inventors: William L. Dunlap, Elkhart, IN (US); Terry L. Trindle, Elkhart, IN (US)

(73) Assignee: Dexter Axle Company, Elkhart, IN (US)

( * ) Notice: Subject to any disclaimer, the term of this patent is extended or adjusted under 35 U.S.C. 154(b) by 0 days.

(21) Appl. No.: 10/136,135

(22) Filed: May 1, 2002

(65) Prior Publication Data

US 2003/0205870 A1 Nov. 6, 2003

(51) Int. Cl.⁷ .............................................. B60G 17/00
(52) U.S. Cl. .................................................. 280/6.157
(58) Field of Search ....................... 280/6.157, 124.175; 267/271

(56) References Cited

U.S. PATENT DOCUMENTS

| | | |
|---|---|---|
| 1,943,566 A | 1/1934 | Tryon |
| 2,104,284 A | 1/1938 | Wohlfarth |
| 2,698,186 A | 12/1954 | Pehl |
| 3,499,660 A | 3/1970 | Raidel |
| 3,502,345 A | 3/1970 | Hulverson |
| 3,799,562 A * | 3/1974 | Hinchliff .................... 280/682 |
| 4,000,913 A * | 1/1977 | Gibson ...................... 280/86.5 |
| 4,083,545 A * | 4/1978 | Herbenar .................... 267/266 |
| 4,093,272 A | 6/1978 | Raidel |
| 4,219,211 A * | 8/1980 | Sauers ..................... 280/441.2 |
| 4,342,469 A * | 8/1982 | Corner et al. ......... 280/124.106 |
| 4,362,318 A * | 12/1982 | Lampert .............. 280/124.175 |
| 4,371,189 A * | 2/1983 | Raidel ....................... 280/682 |
| RE31,298 E * | 7/1983 | Herbenar .................... 267/266 |
| 4,397,478 A * | 8/1983 | Jensen et al. ............. 280/6.159 |
| 4,412,690 A * | 11/1983 | Prokop et al. ............... 280/686 |
| 4,676,523 A | 6/1987 | Rogers |
| 4,718,693 A * | 1/1988 | Booher ................. 280/124.107 |
| 4,824,138 A | 4/1989 | Rappold |
| 4,953,891 A * | 9/1990 | Zantinge ..................... 280/788 |
| 4,995,634 A * | 2/1991 | Evans ........................ 280/682 |
| 5,024,462 A * | 6/1991 | Assh .......................... 280/680 |
| 5,029,893 A * | 7/1991 | Walton et al. ............. 280/5.513 |
| 5,058,917 A * | 10/1991 | Richardson ................. 280/86.5 |
| 5,086,866 A * | 2/1992 | Banjo et al. ................. 180/219 |
| 5,240,091 A * | 8/1993 | Stjarne .................... 188/206 R |
| 5,328,159 A * | 7/1994 | Kaufman et al. ............. 267/52 |
| 5,337,997 A | 8/1994 | Hockney |
| 5,562,348 A * | 10/1996 | Link .......................... 384/474 |
| 5,599,038 A * | 2/1997 | German ................. 280/124.175 |
| 6,003,885 A * | 12/1999 | Richardson ................. 280/86.5 |
| 6,199,876 B1 * | 3/2001 | Eckelberry ................ 280/6.151 |
| 6,209,897 B1 * | 4/2001 | Bundy et al. ......... 280/124.175 |
| 6,247,689 B1 | 6/2001 | Haesle et al. |
| 6,478,321 B1 * | 11/2002 | Heitzmann ........... 280/124.177 |
| 6,485,040 B1 * | 11/2002 | Dudding .............. 280/124.175 |

* cited by examiner

*Primary Examiner*—Charles T. Jordan
*Assistant Examiner*—Jordan Lofdahl
(74) *Attorney, Agent, or Firm*—Calfee, Halter & Griswold LLP

(57) ABSTRACT

An individual hanger as well as a hanger system is provided for changing the height on a trailer. Each individual hanger includes a hanger spacer which is easily removable and interchangeable with hanger spacers of a different size. The system includes hanger spacers of the same and differing heights so that different combinations of hanger spacers can be used to achieve different trailer heights.

20 Claims, 3 Drawing Sheets

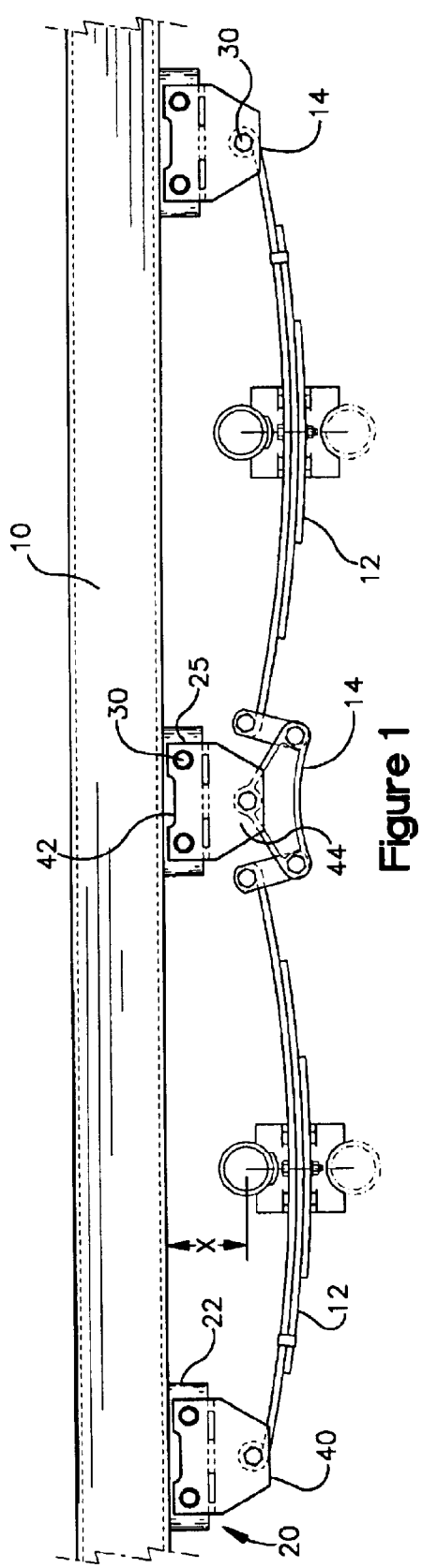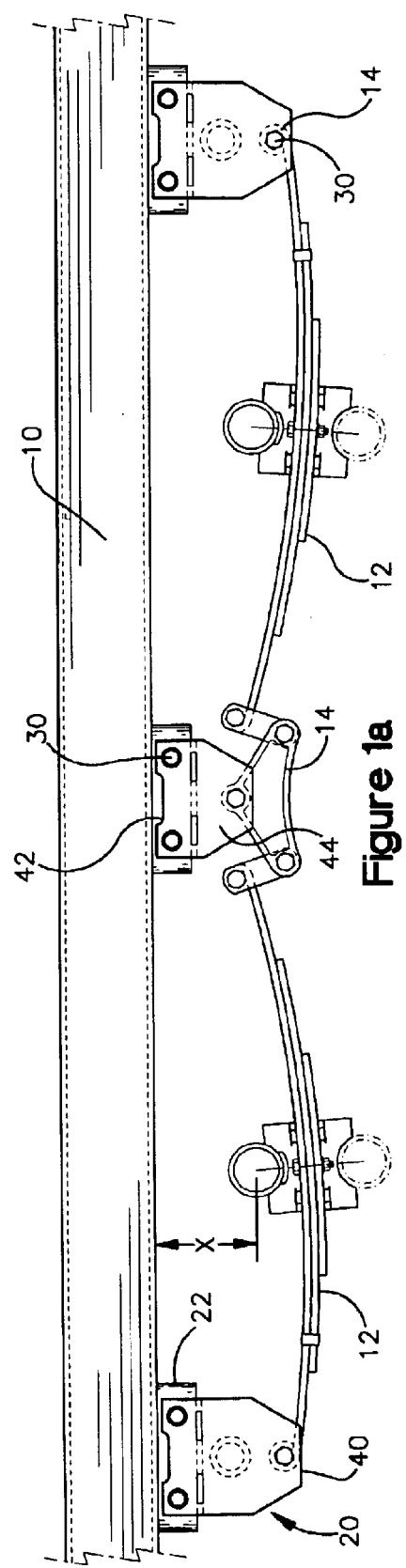

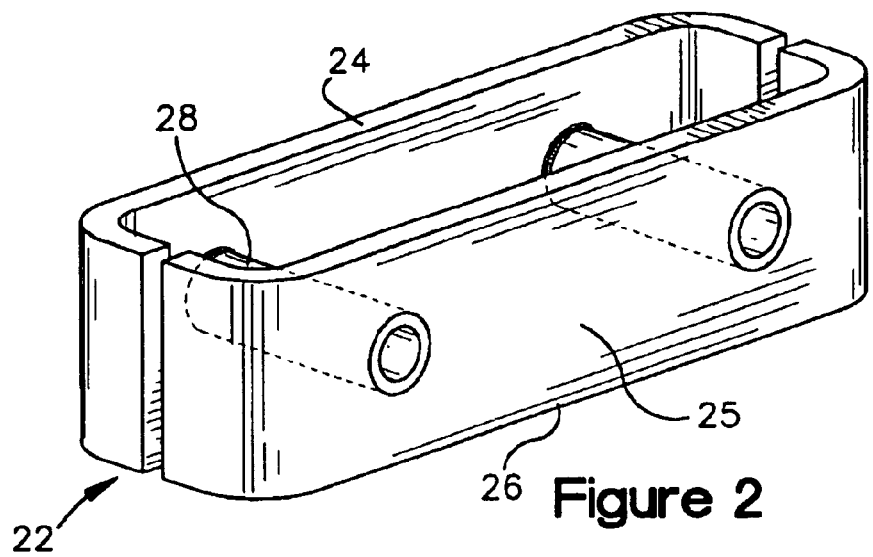
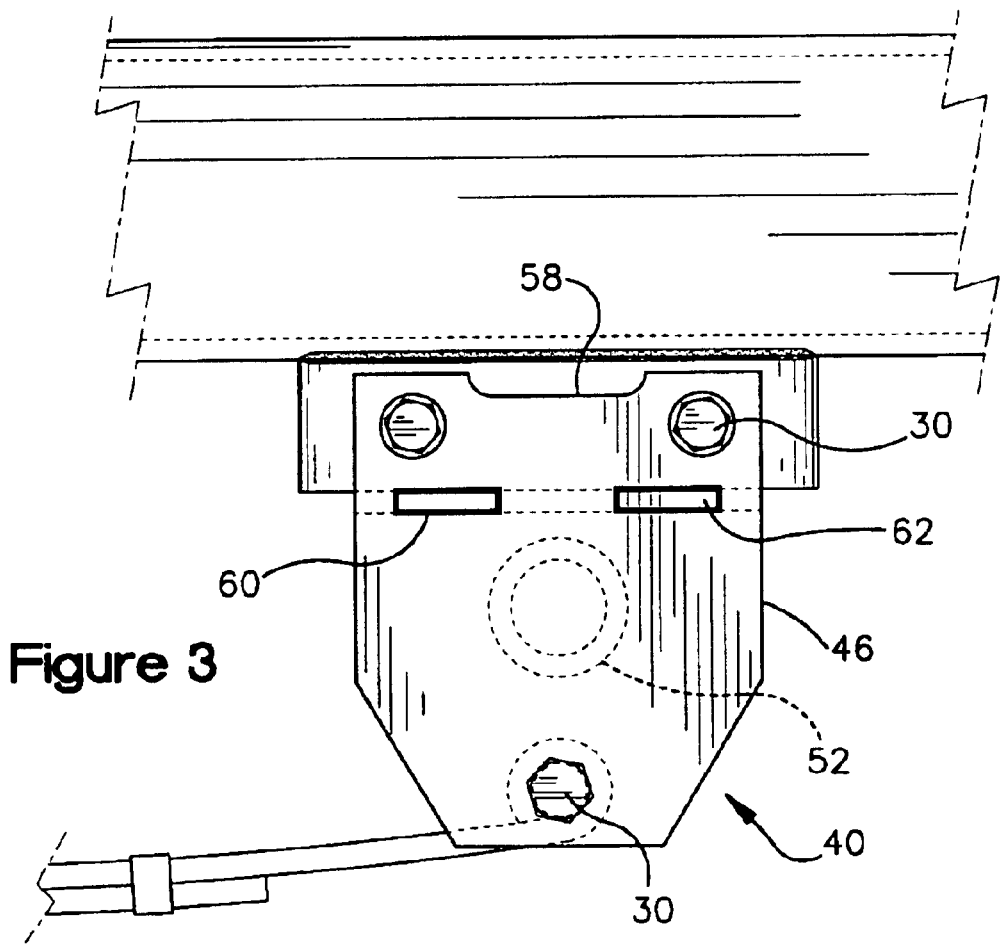

US 6,708,988 B2

HANGERS FOR TRAILER HEIGHTS ADJUSTMENT

FIELD OF THE INVENTION

This invention relates generally to vehicle accessories and more specifically to hangers for use on trailers.

BACKGROUND OF THE INVENTION

Trailers are pulled by automobiles (trucks, tractors, cars, etc.) and are used to move quantities of goods, often goods having a large size. The automobile used to pull a trailer is often determined by the size of the load, automobile availability, and randomness when the trailer and automobile are not owned by the same entity. Because all automobiles are not uniform, the height of the automobile and trailer at a joining point may not be equal. As a result it may be necessary to raise or lower the height of the trailer to match the height of the automobile. A common way to vary trailer height is to vary the distance between the springs on the trailer and the bed of the trailer. This can be accomplished by varying the size of the spring's hanger. What is desired is a spring hanger, a part of which can easily and quickly be removed and replaced to achieve different trailer heights. Sets of these hangers having various sizes are also desired.

SUMMARY OF THE INVENTION

The present invention is directed to an interchangeable hanger for adjusting the height between a trailer bed and trailer springs. The hanger includes a hanger base attachable to the trailer bed, a hanger spacer attachable to the hanger base and attachable to a trailer spring mount, wherein the hanger spacer includes two spaced plates, and fasteners to attach the hanger spacer intermediate the hanger base and the trailer spring mount.

The present invention is also directed to a system for adjusting the height between a trailer bed and trailer springs which includes first and second hanger bases attachable to the trailer bed as well as first and second hanger spacers of predetermined heights which are removably attachable intermediate the hanger bases and trailer spring mounts. The system also includes fasteners to attach the hanger spacers intermediate the hanger bases and trailer spring mounts.

An advantage to the individual hanger or hanger system of the present invention is the ability to quickly and easily change the height of a trailer. The hanger spacer, which is replaced to change height, is easily accessible and detachable. A second advantage of the hanger system is the ability to combine hanger spacers of different heights to produce a trailer height which varies from that produced with hanger spacers of all identical heights.

These and other features, aspects and advantages of the present invention will become better understood with regard to the following description, appended claims, and accompanying drawings.

BRIEF DESCRIPTION OF FIGURES

FIG. 1 is a side view of a section of a trailer including the present invention;

FIG. 1a is a side view of a section of a trailer including an alternate arrangement of hanger spacers of the present invention;

FIG. 2 is a perspective view of a hanger base of the present invention;

FIG. 3 is a side view of a hanger spacer of the present invention;

DETAILED DESCRIPTION OF ILLUSTRATED EMBODIMENT

Figure 4:
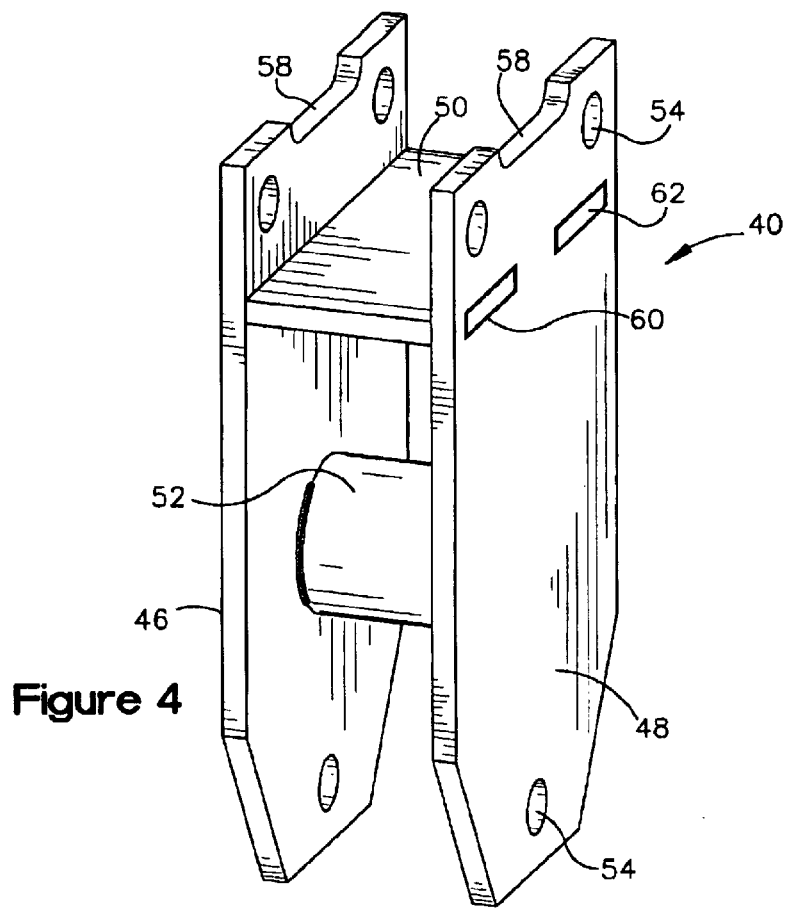
FIG. 4 is a front view of a hanger spacer of the present invention.

Referring to FIGS. 1 and 1a, a system for adjusting the height between a trailer bed 10 and trailer springs 12 is shown. As described in more detail below, the system includes a number of hangers 20. Each hanger 20 may include a hanger base 22, hanger spacer 40 and fasteners 30 to hold both together. The hanger bases 22 may be affixed to the trailer bed 10 and may or may not be easily removable. The hanger spacers 40 attach to the hanger bases 22 on one end 42 and a spring mount 14 of the trailer spring 12 on an opposite end 44. The hanger spacers 40 are easily detachable and replaceable. The hanger spacers 40 may be replaced with a hanger spacer 40 of a different height, compare FIG. 1 with FIG. 1a, in order to change the distance "X" between the trailer spring 12 and trailer bed 10. As a result the distance between the trailer axles, which attach to the springs, and trailer bed 10, and thus, the trailer's overall height, is changed. This allows variation of the trailer height for reasons such as: different heights of a pulling automobile, different heights of implements for loading the trailer, and for the leveling of an uneven trailer.

FIG. 2 shows a typical hanger base 22. The hanger base 22 may be formed from two C flanges 24 and 26 joined using one or more guide braces 28. The C flanges 24 and 26 may be formed from a similar material to the trailer bed 10. For example, if the trailer bed 10 is made from steel, the C flanges 24 and 26 may be made from steel, allowing the C flanges 24 and 26 to be joined to the trailer bed 10 by welding. However, a hanger base 22 of a dissimilar material to the trailer bed 10 may also be used and attached using bolts or the like. The hanger base 22 may be attached directly to the trailer bed 10. The hanger base 22 may also be indirectly attached to the trailer bed 10 by being attached to some fixture upon the trailer bed 10. Each C flange 24 and 26 includes a predominantly flat face portion 25. Use of two separate C flanges, typically formed by a stamping process, may be substituted by a one piece box piece formed by a casting, forging or bending process. The hanger base 22 functions to provide a junction between the hanger spacer 40 and the trailer bed 10. The hanger base 22 provides space for a more easily accessible and manipulable joint as compared to a direct joint between the hanger spacer 40 and trailer bed 10. The C flanges 24 and 26 may be sized to allow any size hanger spacer 40 to be attached easily. The width between the flat faces of each C flange 24 and 26 is precisely maintained to provide a superior joint between the hanger base 22 and hanger spacer 40. Referring back to FIG. 1, the hanger base 22 is shown attached to the trailer bed 10 with the lengthwise portion of the base 22 abutting the bed 10.

Referring back to FIG. 2, two guide braces 28 are shown joining first 24 and second 26 C flanges together. The guide braces 28 may be any shape, but are shown as round hollow pieces. The guide braces 28 may be fitted into apertures defined by the C flanges. When in place, a guide brace 28 may extend through the hanger base 22 and be flush with the outside flat face 25 of each C flange 24 and 26. The guide braces 28 may be attached to each C flange 24 and 26 of the hanger base 22 by welding. The guide braces 28 may be oriented perpendicular to the flat face 25 of each C flange 24 and 26. The guide brace 28 functions to hold the two C flanges 24 and 26 together. The guide brace 28 also provides a guide for the fasteners 30 which hold the hanger spacers 40 to the hanger bases 22. This guiding function makes changeover of hanger spacers 40 faster and easier. The guide brace 28 also functions to protect the fasteners 30 from external damage.

Referring to FIGS. 3 and 4 a typical hanger spacer 40 is shown. The hanger spacer 40 includes two plates 46 and 48 spaced apart. The plates 46 and 48 may be generally rectangular shaped. The plates may include a notched portion 58 which provides extra clearance which may be required if the hanger spacer abuts, when assembled, a weld bead between the trailer bed and hanger base. The plates 46 and 48 may be oriented generally parallel. One or more edges may be beveled to provide clearance for other parts of the trailer. The plates 46 and 48 may be made from steel, steel alloys, titanium or aluminum depending upon the properties required. The plates 46 and 48 may be joined by a cross brace 50 placed between the plates 46 and 48. The cross brace 50 may be perpendicular to the plates 46 and 48. One or more notches 60 may be formed in each plate 46 and 48. Into these notches 60, tabs 62 upon the cross piece 50 may be inserted. The tabs 62 of the cross brace 50 may then be welded to each plate. The cross brace 50 functions to prevent excess force upon the fasteners 30 which hold the hanger base 22 and hanger spacer together. As excessive upward force is placed upon the hanger spacer 40, the cross brace 50 is forced into the bottom of the hanger base 22 instead of having all the force transferring in shear to the fasteners 30. On larger hanger spacers 44 an additional brace 52 may be used to connect the plates 46 and 48 together. The additional brace 52 may be any shape, but is shown as being tubular in FIG. 3. The plates 46 and 48 each define a number of apertures 54. In one embodiment of the invention, the plates 46 and 48 each define at least two apertures 54. The apertures 54 may be located on an upper portion of the plates. The apertures 54 may be used to attach the hanger spacer 40 to the hanger base 22. The plates 46 and 48 each may also define one or more apertures 54 located on a lower portion of the plates. The apertures 54 may be used to attach the hanger spacer 40 to a spring mount 14. Fasteners 30 pass through the apertures 54 in order to facilitate attachment.

Referring back to FIG. 1, the hanger spacer 40 functions to define and easily change the height of the trailer bed 10. The hanger spacer 40 can easily be removed and replaced from between the hanger base 22 and spring mount 14. The hanger spacer 40 may be provided in a number of different sizes to allow a number of different trailer heights. The hanger spacer 40 may be attached on one end 42 to a hanger base 22. Each plate 46 and 48 of the hanger spacer 40 may abut against the outside of the generally flat face 25 of the hanger base 22. Apertures 54 defined by the hanger spacer 40 may be aligned with the guide braces 28 and a fastener 30, typically a bolt, may be passed through the apertures 54 and guide brace 28 and secured with a nut. The hanger spacer 40 may be attached to a spring mount 14 as well. The spring mount 14 may be the end of a vehicle spring 12 or an intermediate part, wherein the intermediate part attaches to the vehicle spring 12 and to the hanger spacer 40. Again, an aperture 54 defined by the hanger spacer 40 may be used in conjunction with a fastener 30 to create a joint.

Figure 5:
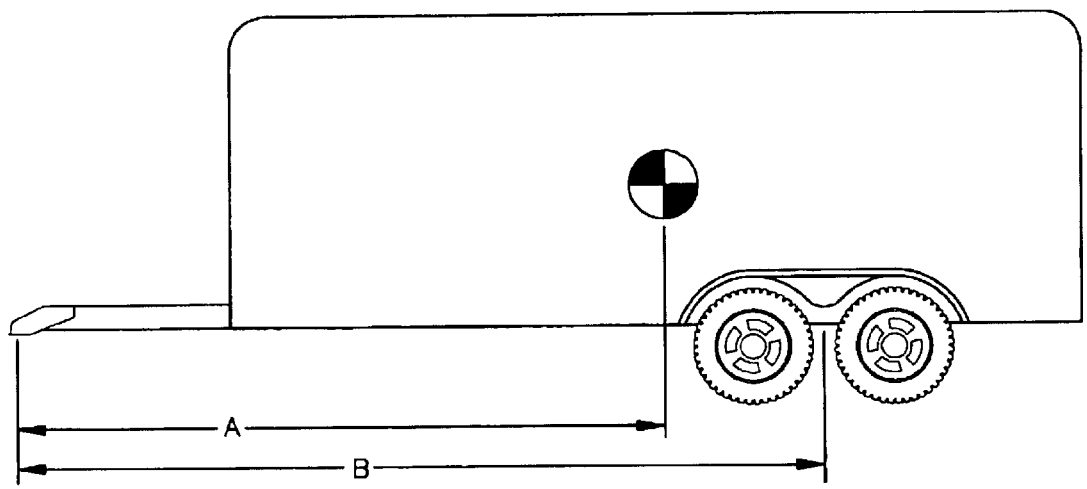
FIG. 5 is a schematic side view of a trailer.

The hanger spacer 40 may be provided in many sizes, each size having a predetermined height. Different sizes may be used to achieve different trailer bed heights. Preferred sizes of the hanger spacers 40 include heights of 3.62 inches, 5.62 inches and 7.62 inches. Multiple hanger spacers 40 are used in conjunction with multiple hanger bases 22 as part of a system which allows quick adjustment of the height between the trailer bed 10 and trailer springs 12. Hanger spacers 40 may be used in different combinations. In a typical trailer setup two axles are located relatively close together (see FIG. 5). A spring 12 is associated with each axle as shown in FIG. 1. Three hangers 20 may be used to support the two springs 12. FIG. 1 shows the use of hangers 20 having hanger spacers 40 of equal height. FIG. 1a shows an alternate configuration where two of the hangers 20 have equal heights and the third hanger 20 is of a lesser height.

The hanger bases 22 and hanger spacers 40 may be provided in a set or sets. The set may include hanger spacers 40 which are not always in use, but are ready to be used if the height of the trailer needs to be changed. In one embodiment of the invention a set of more than one hanger bases 22 is provided in combination with a first set of hanger spacers 40 all of the same height. At least one of the hanger spacers 40 from this first set is attached to a hanger base 22 when installed upon the trailer. In this embodiment of the invention a second set of hanger spacers 40 is also provided. The spacers 40 within the second set have a height which is different from the hanger spacers 40 in the first set. Depending upon the number of hanger spacers 40 in the first set of which are attached to hanger bases 22, some or none of the hanger spacers 40 in the second set may be attached to hanger bases 22. However, the hanger bases 22 of the second set are available if the height of the trailer must be changed. At that point a different combination of hanger spacers 40 is attached to the hanger bases 22. A third set of hanger spacers 40 may also be provided. The height of spacers 40 in the third set differs from the height of hangers 40 in the second set. Hanger spacers 40 from the third set may be used alone or in combination with hangers 40 from the second set to vary the height of the trailer.

In one embodiment of the invention for a trailer having two springs 12 on each side, six hanger bases 22 are provided in combination with two sets of hanger spacers 40. The first set of hanger spacers 40 includes six spacers 40 of equal height. The second set also includes six spacers 40 of equal height, but a height which is different from the spacers 40 in the first set. Three distinctive trailer heights may be provided by using all the spacers 40 in either set (2) or four spacers 40 of the second set in combination with two spacers 40 of the first set (1). In any embodiment of the invention, the trailer height may also be varied by the method in which the trailer axle is attached to the spring 12, either underslung or over-slung (shown in phantom lines in FIGS. 1 and 1a).

Typical fasteners 30 used to attach the hanger spacers to the hanger bases and spring mounts are nuts and bolts. Substitute fasteners include a combination of pins with locking clips.

Additional advantages and modifications will readily appear to those skilled in the art. For example, the hanger bases may not be attached directly to the trailer bed, but instead to an intermediate part. Further, other types of quick connect/disconnect fasteners known in the art may be used to join the hanger spacers to the hanger bases. Also, additional braces may be added to either the hanger base, hanger spacer, or both. Therefore, the invention, in its broader aspects, is not limited to the specific details, the representative apparatus, and illustrative examples shown and described. Accordingly, departures may be made from such details without departing from the spirit or scope of the applicant's general inventive concept.

What is claimed is:

1. An interchangeable hanger for adjusting the height between a trailer bed and trailer springs comprising:
    a hanger base attachable to the trailer bed;
    a hanger spacer attachable to said hanger base and attachable to a trailer spring mount, said hanger spacer including two spaced plates; and
    fasteners to attach said hanger spacer intermediate said hanger base and said trailer spring mount.

2. The interchangeable hanger of claim 1 wherein said spaced plates are generally parallel.

3. An interchangeable hanger for adjusting the height between a trailer bed and trailer springs comprising:
    a hanger base attachable to the trailer bed:
    a hanger spacer attachable to said hanger base and attachable to a trailer spring mount said hanger spacer including two spaced plates:
    fasteners to attach said hanger spacer intermediate said hanger base and said trailer spring mount; and
    wherein said hanger base includes at least two guide braces therethrough and through which said fasteners pass.

4. The interchangeable hanger of claim 3 wherein said hanger spacer defines at least two apertures in each plate through which said fasteners pass.

5. The interchangeable hanger of claim 4 wherein said hanger spacer further defines an aperture for use in attaching said hanger spacer to said trailer spring mount.

6. The interchangeable hanger of claim 4 wherein said fasteners are nuts and bolts which can be quickly removed and replaced.

7. The interchangeable hanger of claim 1 further including a brace between said two plates.

8. An interchangeable hanger spacer, attachable to a base mounted upon a trailer bed, for adjusting the height between a trailer bed and trailer springs comprising:
    first and second generally parallel spaced plates, each plate defining at least two upper apertures for the passage of base fasteners and each plate defining at least one lower aperture for the passage of a spring mount fastener;
    a cross brace permanently connecting said first and second spaced plates wherein said brace is perpendicular to said first and second spaced plates and configured to abut against the base mounted upon a trailer bed when the hanger spacer is mounted upon the trailer bed.

9. A system for adjusting the height between a trailer bed and trailer springs comprising:
    first and second hanger bases attachable to the trailer bed;
    first and second hanger spacers of predetermined heights, said first and second hanger spacers being removably attachable intermediate said hanger bases and first and second trailer spring mounts;
    fasteners to attach said hanger spacer intermediate said hanger base and said trailer spring mount.

10. The system of claim 9 wherein said first and second hanger spacers have equal heights.

11. The system of claim 9 wherein said first hanger spacer height exceeds said second hanger spacer height.

12. The system of claim 9 further including a third hanger base and a third hanger spacer of predetermined height.

13. The system of claim 12 wherein said first, second and third hanger spacers have equal heights.

14. The system of claim 12 wherein said first and second hanger spacers have equal heights which exceed said third hanger spacer height.

15. A system for adjusting the height between a trailer bed and trailer springs comprising:
    a set of more than one hanger bases attachable to the trailer bed;
    a first set of more than one hanger spacers of uniform height wherein at least one of said hanger bases is attached to a hanger spacer from said first set;
    and a second set of more than one hanger spacers of a uniform height different from the height of hanger spacers with said first set, wherein any hanger bases not attached to a hanger spacer from said first set are attached to a hanger spacer from said second set; and
    wherein each hanger spacer from the first and second sets attached to a hanger base is also attached to a trailer spring mount.

16. The system of claim 15 including at least six hanger bases, and at least six hanger spacers in said first set and at least six hanger spacers in said second set whereby two different combinations of hanger spacers may be used to create three different heights between said trailer bed and trailer springs.

17. A system for easily and repeatedly adjusting the height between a trailer bed and trailer springs comprising:
    a set of more than one hanger bases attachable to the trailer bed;
    a first set of interchangeable hanger spacers of uniform height, each spacer of said first set adapted for attachment at a first end to a hanger base and at a second end to a trailer spring mount;
    a second set of interchangeable hanger spacers of uniform height different from the height of hanger spacers within said first set, each spacer of said second set adapted for attachment at a first end to a hanger base and at a second end to a trailer spring mount;
    a third set of interchangeable hanger spacers of uniform height different from the height of hanger spacers within said first set and said second set, each spacer of said third set adapted for attachment at a first end to a hanger base and at a second end to a trailer spring mount;
    whereby different heights between the trailer bed and trailer springs may be achieved by attaching different combinations of hanger spacers from said first and second sets, or second and third sets to said hanger bases and said trailer spring mounts.

18. The system of claim 17 including at least six hanger bases, and at least six hanger spacers in said first set and at least six hanger spacers in said second set and at least two hanger spacers in said third set whereby two different combinations of hanger spacers may be used to create two different heights between said trailer bed and trailer springs.

19. The interchangeable hanger of claim 1 said hanger base includes a flat face portion providing a junction with said hanger spacer.

20. The interchangeable hanger of claim 19 wherein in an attachment configuration one of said spaced plates of said hanger spacer overlaps said flat face portion of said hanger base and at least one fastener passes through apertures in said spaced plate and said face portion.

* * * * *